United States Patent
Wilsterman et al.

(10) Patent No.: US 6,773,250 B2
(45) Date of Patent: Aug. 10, 2004

(54) METHOD AND APPARATUS FOR DEGATING MOLDED PARTS FROM A RUNNER

(75) Inventors: Zachary Wilsterman, Peoria, AZ (US); Thomas G. Kieran, Peoria, AZ (US)

(73) Assignee: The Tech Group, Scottsdale, AZ (US)

( * ) Notice: Subject to any disclaimer, the term of this patent is extended or adjusted under 35 U.S.C. 154(b) by 85 days.

(21) Appl. No.: 10/044,655

(22) Filed: Jan. 11, 2002

(65) Prior Publication Data

US 2003/0132553 A1 Jul. 17, 2003

(51) Int. Cl.[7] .......................... B29C 45/38; B29C 45/40
(52) U.S. Cl. ................... 425/174.2; 264/161; 264/334; 264/442; 425/315; 425/556
(58) Field of Search ................................ 264/161, 334, 264/328.9, 442

(56) References Cited

U.S. PATENT DOCUMENTS

| | | |
|---|---|---|
| 4,585,152 A | 4/1986 | Sager |
| 4,787,841 A * | 11/1988 | Simon .......................... 425/556 |
| 6,537,055 B2 * | 3/2003 | Adachi ........................ 425/315 |

OTHER PUBLICATIONS

Branson Applied Technologies Group, author unknown, "Designing Parts for Ultrasonic Degating", Technical Information PW-8, 8/99.
Branson Applied Technologies Group, author unknown, "Ultrasonic Assembly Systems," 9/99.

* cited by examiner

Primary Examiner—Tim Heitbrink
(74) Attorney, Agent, or Firm—Snell & Wilmer, L.L.P.

(57) ABSTRACT

A system for removing from a molding tool a runner assembly having a plurality of molded parts that are connected to a runner via gates and subsequently degating the plurality of molded parts from the runner is provided. The system includes a source of ultrasonic energy and a robot arm assembly. The robot arm assembly is configured to remove the runner assembly from the molding tool and to position the runner assembly proximate the source of ultrasonic energy.

17 Claims, 11 Drawing Sheets

METHOD AND APPARATUS FOR DEGATING MOLDED PARTS FROM A RUNNER

FIELD OF THE INVENTION

The present invention generally relates to the degating of molded parts from a runner and more particularly to a system and method for removing from a molding tool a plurality of molded parts that are connected to a runner via gates and subsequently degating the plurality of molded parts from said runner in a single phase operation.

BACKGROUND OF THE INVENTION

The injection molding of thermoplastic molded parts typically involves the injection of molten thermoplastic material into a mold that provides for the connection of a plurality of molded parts to a runner, referred to herein as a "runner assembly." By molding the runner assembly so that the molded parts are connected to a runner, the molded parts may be removed from the mold at one time by simply removing the runner assembly. This eliminates the need to remove the molded parts individually, and thus increases throughput. Typically, each of the molded parts is connected to the runner via a gate, which is a thin or narrow portion of the thermoplastic material. After the runner assembly is removed from the molding tool, the molded parts may be separated from the runner by cutting, breaking or melting the gate.

The separation of molded parts from runners through the introduction of ultrasonic energy into the gate is referred to as ultrasonic degating. Sources of ultrasonic energy include ultrasonic horns which, when positioned suitably close to the runners, ultrasonically excite the gates by producing mechanical vibrations in the runner. The mechanical vibrations generate a standing wave of energy down the runner through the gate and into the molded part, which resonates. The freely resonating part goes through a cyclic bending moment with the gate which induces stress into the gate and generates internal molecular friction. The internal molecular friction raises the temperature of the gates. When the melting temperature of the gate is reached, the molded part is separated from the runner.

The removal of the runner assembly from the molding tool and the degating of the molded parts from the runner are typically performed during a multiple phase operation. First, the runner is removed from the molded tool manually by a first automatic holder and stored in a collection unit. The runner assembly may then be removed from the collection unit and manually or mechanically positioned in a second holder proximate to an ultrasonic horn for degating. Alternatively, the runner assembly may be manually or mechanically placed on a conveyor belt after removal from the molding tool and transferred from the molded tool to the ultrasonic horn. The runner assembly may then be manually or mechanically positioned in a second holder for degating. However, this multiple phase operation limits throughput of the injection molding process. In addition, because of the handling of the runner assembly by multiple holders, the multiple phase operation risks breaking of the runner assembly. Further, multiple phase operations are typically expensive due to the additional hardware and tooling required to facilitate the multiple phases of operation.

Accordingly, there is a need for a system and method for removing from a molding tool a runner assembly and subsequently degating the molded parts from the runner of the runner assembly in a single operation.

SUMMARY OF THE INVENTION

This summary of the invention section is intended to introduce the reader to aspects of the invention and is not a complete description of the invention. Particular aspects of the invention are pointed out in other sections hereinbelow, and the invention is set forth in the appended claims which alone demarcate its scope.

In accordance with an exemplary embodiment of the present invention, a system for removing from a molding tool a runner assembly having a plurality of molded parts that are connected to a runner via gates and subsequently degating the plurality of molded parts from the runner is provided. The system includes a source of ultrasonic energy and a robot arm assembly. The robot arm assembly is configured to remove the runner assembly from the molding tool and to position the runner assembly proximate the source of ultrasonic energy.

In accordance with another exemplary embodiment of the present invention, a method for degating a plurality of molded parts that are connected to a runner via gates is provided. The method includes causing a robot arm assembly to position the plurality of molded parts and the runner proximate to a source of ultrasonic energy. The method also includes pressing the runner against the source of ultrasonic energy. The method further includes activating the source of ultrasonic energy so that the plurality of molded parts is degated from the runner.

In accordance with a further exemplary embodiment of the present invention, a robot arm assembly for holding a runner assembly comprising a plurality of molded parts and a runner connected thereto during degating of the plurality of molded parts from the runner is provided. The robot arm assembly includes a robot arm configured to transport the runner assembly from a molding tool to a source of ultrasonic energy. The robot arm assembly also includes a carrier assembly configured to hold the runner assembly.

These and other aspects of the present invention are described in the following description, attached drawings and claims.

BRIEF DESCRIPTION OF THE DRAWINGS

A more complete understanding of the present invention may be derived by referring to the detailed description and claims, considered in connection with the figures, wherein like reference numbers refer to similar elements throughout the figures, and:

FIG. 1b is a schematic illustration of a side view of the runner assembly of FIG. 1a;

FIG. 2b is a schematic illustration of a side view of the runner assembly of FIG. 2a;

FIG. 4b is a schematic illustration of a side view of the carrier assembly of FIG. 4a;

FIG. 5b is a schematic illustration of a side view of the carrier assembly of FIG. 5a;

FIG. 8a is a schematic illustration of a side view of a piston in accordance with an exemplary embodiment of the present invention;

FIG. 8b is a schematic illustration of a bottom view of the piston of FIG. 8a;

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EXEMPLARY EMBODIMENTS

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1A:
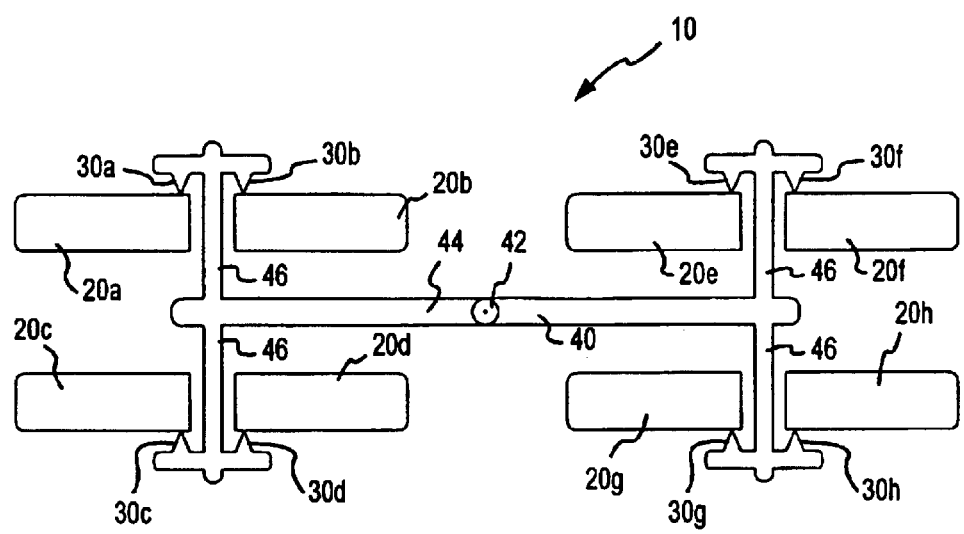
FIG. 1a is a schematic illustration of a top view of a typical runner assembly.
Figure 1B:
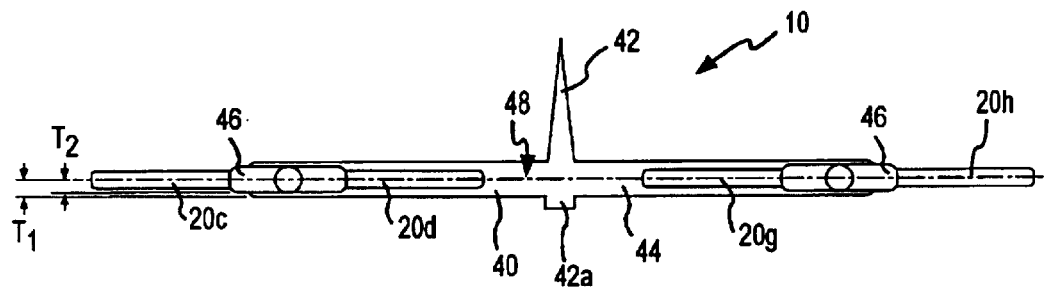

FIGS. 1a and 1b illustrate one example of a typical runner assembly 10 formed after injection molding of a thermoplastic material into an injection mold. Runner assembly 10 comprises a plurality of molded parts 20a, 20b, 20c, 20d, 20e, 20f, 20g and 20h, which are connected to at least one runner 40 via a plurality of gates 30a, 30b, 30c, 30d, 30e, 30f, 30g, and 30h, respectively. Runner 40 includes a main runner 44 which is integrally connected to cross runners 46, which in turn are integrally connected to gates 30a–30h. Runner 40 includes a sprue 42 that extends from the runner and is configured to permit a sprue gripper to grip and hold runner assembly 10. Runner assembly 10 may also have an under-sprue 42a that is formed during molding of the runner assembly. The thickness $T_1$ of main runner 44 from a center plane 48 to a bottom surface of main runner 44 may be greater than a thickness $T_2$ of cross runner 46 from center plane 48. The runner assembly 10 may be formed of polystyrene, acrylonitrile butadiene styrene, polycarbonate, acrylic, nylon, glass filament material, and other suitable thermoplastic materials. While FIGS. 1a and 1b illustrate eight molded parts attached to a runner, it will be appreciated that any suitable number of molded parts may be connected to the runner. In addition, molded parts 20 may be of any suitable size or shape.

Figure 2A:
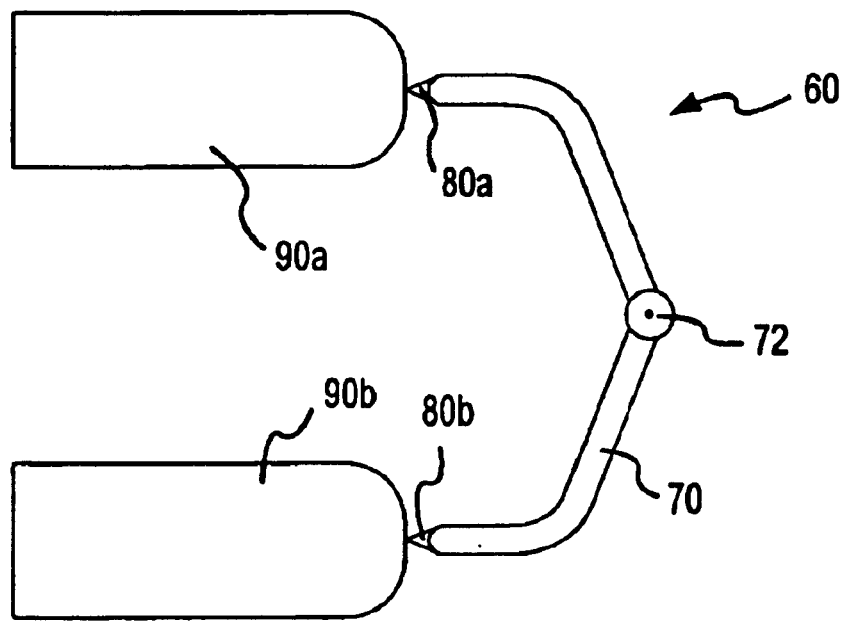
FIG. 2a is a schematic illustration of a top view of another typical runner assembly.
Figure 2B:
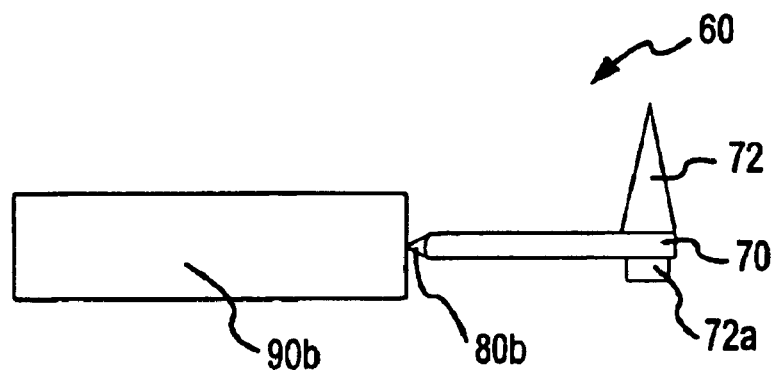

FIGS. 2a and 2b illustrate another example of a typical runner assembly 60 formed after injection molding. Runner assembly 60 comprises a plurality of molded parts 90a and 90b that are connected to a runner 70 via gates 80a and 80b, respectively. Runner 70 includes a sprue 72 that extends from runner 70 and is configured to permit a sprue gripper to grip and hold runner assembly 60. Runner assembly 60 may also have an under-sprue 72a that is formed during molding of the runner assembly. It will be appreciated that runner assemblies suitable for use in the present invention are not limited to the two above-described examples but may be configured in any design suitable for injection molding of molded parts.

Figure 3:
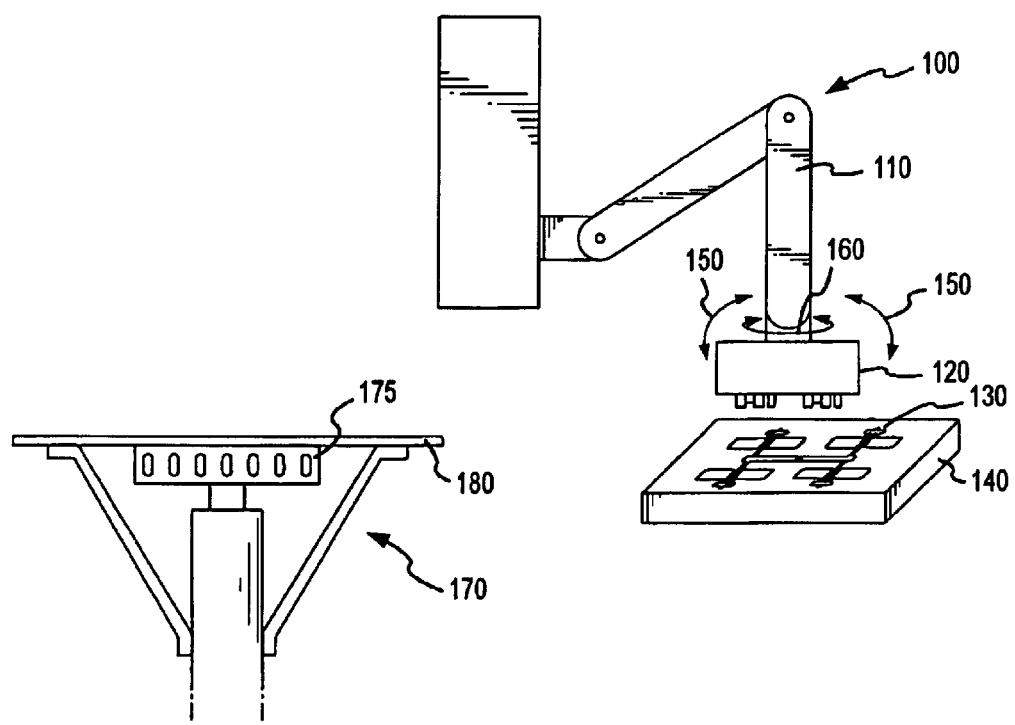
FIG. 3 is a schematic illustration of an exemplary embodiment of the system of the present invention.

FIG. 3 illustrates an exemplary embodiment of the system of the present invention. The system includes a robot arm assembly 100. Robot arm assembly 100 is suitably configured to remove a runner assembly 130 from a molding tool 140 and transport runner assembly 130 to an ultrasonic degating assembly 170. In one embodiment of the invention, robot arm assembly 100, molding tool 140 and ultrasonic degating assembly 170 may be fixedly attached to a frame assembly (not shown) to prevent misalignment of the robot arm assembly 100 relative to the molding tool 140 and ultrasonic degating assembly 170. In an alternative embodiment, one or more of the robot arm assembly 100, molding tool 140, and ultrasonic degating assembly 170 may be configured as a stand-alone unit.

Robot arm assembly 100 includes an articulating robot arm 110 to which is connected a carrier assembly 120. Robot arm assembly 100 is configured so that carrier assembly 120 may rotate and pivot relative to robot arm 110, as illustrated by arrows 150 and 160. Ultrasonic degating assembly 170 includes a source of ultrasonic energy, such as an ultrasonic horn 175. Ultrasonic horn 175 is preferably a bar horn, although any suitable ultrasonic horn may be used. Ultrasonic degating assembly 170 also includes a base 180 to which ultrasonic horn 175 is invertedly mounted. While only one ultrasonic horn 175 is illustrated in FIG. 3, it will be appreciated that, if a runner assembly is sufficiently large in size or has multiple branches, two or more ultrasonic horns may be necessary for degating.

Figure 10:
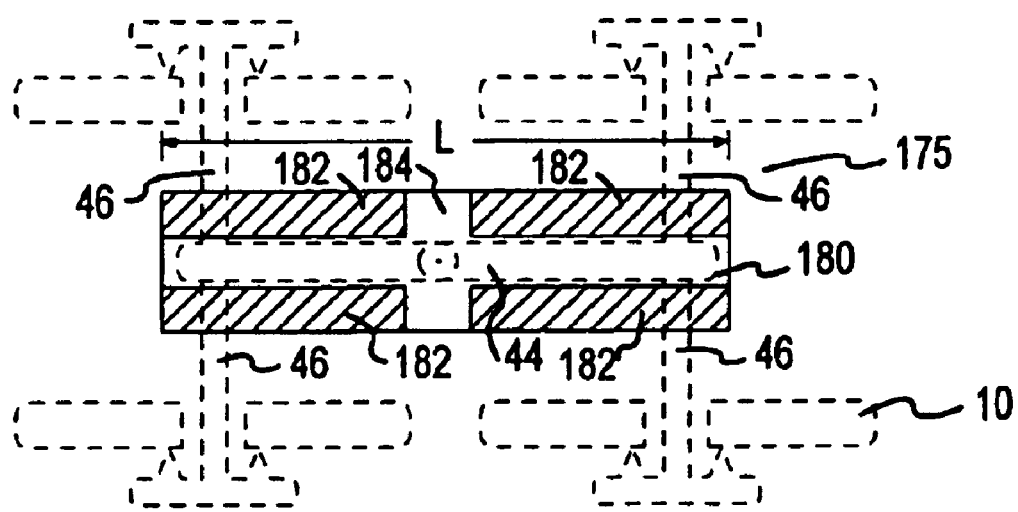
FIG. 10 is a top view of an ultrasonic horn in accordance with an exemplary embodiment of the present invention.

FIG. 10 illustrates one exemplary embodiment of a top surface of an ultrasonic horn 175 of ultrasonic degating assembly 170 used for degating a runner assembly, such as runner assembly 10 illustrated in FIG. 1a. Because many thermoplastic materials do not transmit ultrasonic energy well enough to perform degating at points over 3 to 4 inches from the horn extremities, preferably horn 175 has a length "L" that is at least equal to the length of the runner to be degated. For example, with respect to runner assembly 10 of FIG. 1a, preferably horn 175 has a length "L" at least equal to, if not greater than, the length of main runner 44. Ultrasonic horn 175 may also include a groove 180 which is configured so that main runner 44 may be seated therein. Preferably, groove 180 has a sufficient depth to suitably receive main runner 44 so that cross runners 46 contact surface areas 182 of the horn. Alternatively, if thickness $T_1$ of main runner 44 and thickness $T_2$ of cross runner 46 are equal, groove 180 may not be necessary. Ultrasonic horn 175 may also have a clearance groove 184 that has a depth suitable for receiving an under-sprue, such as under-sprue 42a of runner assembly 10. In an alternative embodiment, a hole may be formed in ultrasonic horn 175 at a position suitable for receiving under-sprue 42a.

Figure 4A:
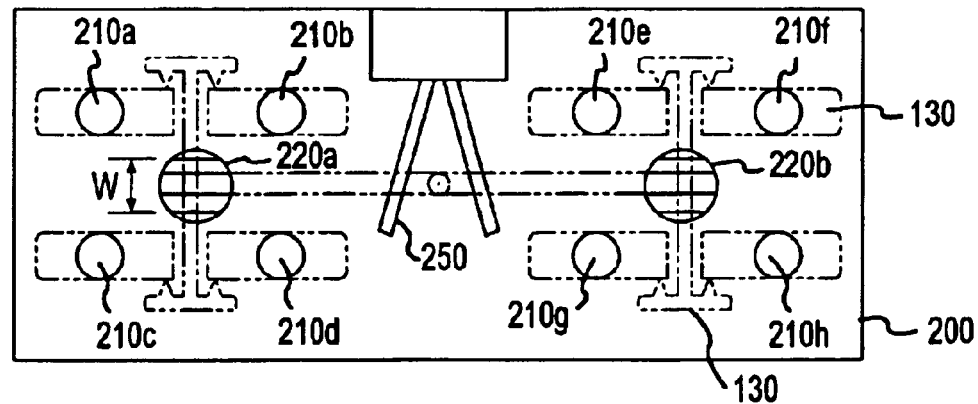
FIG. 4a is a schematic illustration of a bottom view of a carrier assembly in accordance with an exemplary embodiment of the present invention.
Figure 4B:
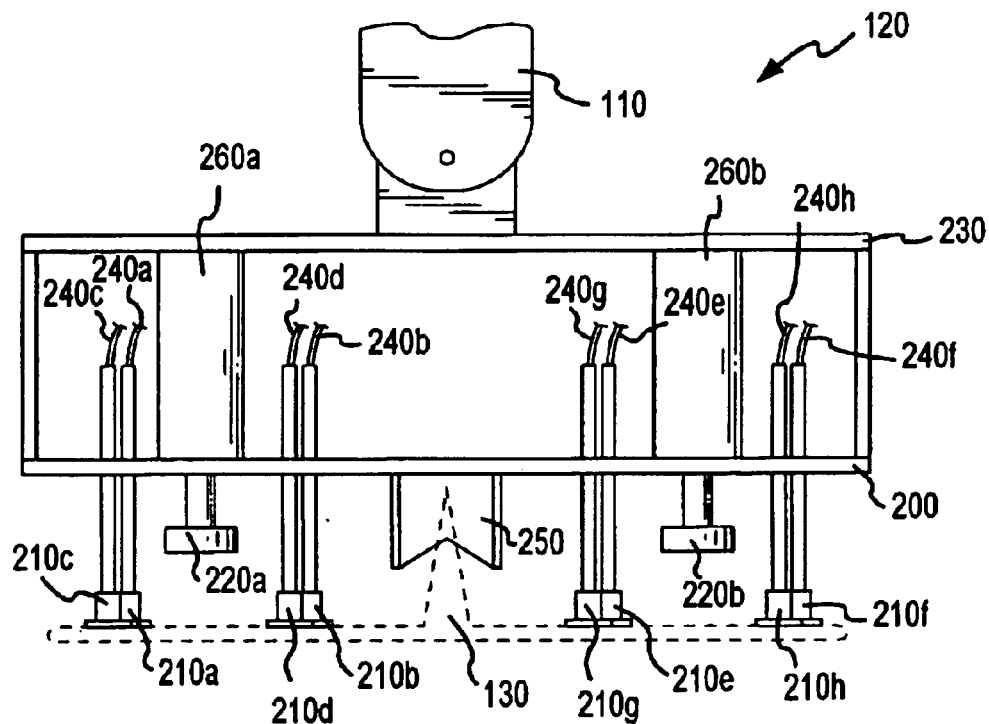

FIGS. 4a and 4b illustrate a carrier assembly 120, according to one exemplary embodiment of the present invention, with a runner assembly 130 illustrated in broken lines superimposed thereon. Carrier assembly 120 illustrated in FIGS. 4a and 4b is configured to hold a runner assembly such as the runner assembly illustrated in FIGS. 1a and 1b. However, it will be appreciated that carrier assembly 120 may be suitably configured to hold assemblies of a variety of different designs. Carrier assembly 120 includes a face plate 200 that is mounted to a frame 230. Frame 230 is movably mounted to robot arm 110. A plurality of end effectors 210a, 210b, 210c, 210d, 210e, 210f, 210g, and 210h are mounted to face plate 200. In a preferable embodiment of the invention, end effectors 210 are suction devices that are each connected to a vacuum source (not shown) via tubing 240a, 240b, 240c, 240d, 240e, 240f, 240g, and 240h. While carrier assembly 120 is illustrated in FIGS. 4a and 4b with eight end effectors, it will be appreciated that carrier assembly 120 may include any number of end effectors suitable for holding a runner assembly. In a preferable embodiment of the invention, the number of end effectors corresponds to the number of molded parts of the runner assembly. It will be appreciated, however, that any number of end effectors suitable for securely holding runner assembly(ies) may be used. End effectors 210a–210h are suitably spaced so that, when holding runner assembly 130, each end effector holds a molded part that is to be degated from the runner of the runner assembly 130. A gripper assembly 250 is also mounted to face plate 200 and is configured to grip the sprue of the runner assembly after the molded parts have been degated from the runner.

Figures 8A, 8B:
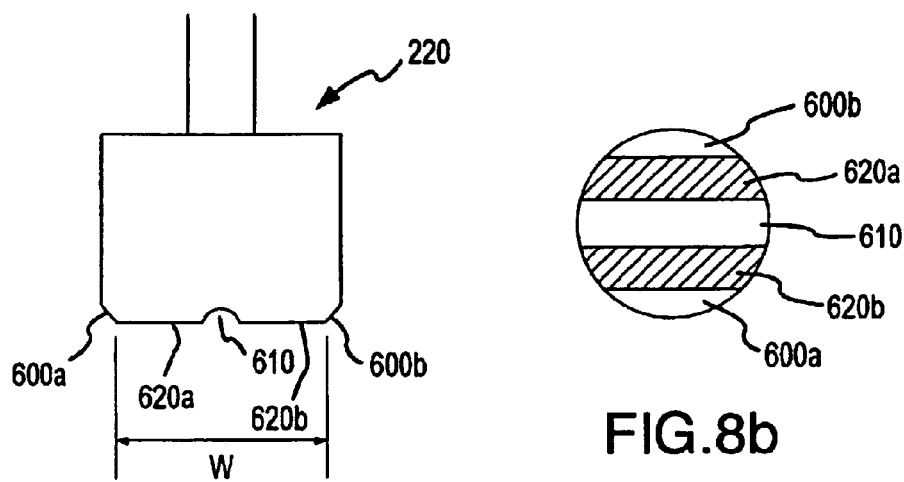

Carrier assembly 120 also includes piston assemblies 260a and 260b, each having a piston 220a and 220b, respectively. When activated, piston assemblies 260a and 260b cause pistons 220a and 220b to move toward runner assembly 130 and press the runner of runner assembly 130 against an ultrasonic horn (not shown). Preferably, pistons 220a and 220b are of a suitable size and are positioned relative to the runner at a suitable point proximate the gates so that as much of the ultrasonic energy from the ultrasonic horn as is practicable is transmitted along the runner to the gates while the amount of ultrasonic energy transmitted to other points of the runner assembly other than the gates is minimized. FIGS. 8a and 8b illustrate one embodiment of a piston 220. As shown, piston 220 may include a groove 610 configured so that a portion of the runner of the runner assembly may be seated therein. With this configuration, piston 220 reduces or eliminates movement of the runner assembly relative to the ultrasonic horn of the ultrasonic degating assembly during degating. Surface areas 620a and 620b of piston 220 contact the runner assembly and press the runner assembly against the ultrasonic horn. Preferably, contact areas 620a and 620b are of a sufficient size suitable for pressing the runner assembly against the ultrasonic horn but are not so large so as to dampen the ultrasonic energy transmitted along the runner to the gates. Referring to FIGS. 4a and 8a, the width "W" of the total contact area of piston 220 preferably is no greater than the width of the ultrasonic horn. To reduce the size of surface areas 620a and 620b, piston 220 may also have beveled edges 600a and 600b. Beveled edges 600a and 600b are suitably configured to reduce or eliminate damping of the transmission of ultrasonic energy along the runner of the runner assembly to the gates, thereby optimizing transmission. While piston 220 is illustrated in FIGS. 8a and 8b as having a circular cross-sectional shape, it will be appreciated that piston 220 may be of a square, rectangular or other shape suitable for pressing the runner assembly against the ultrasonic horn.

Figure 5A:
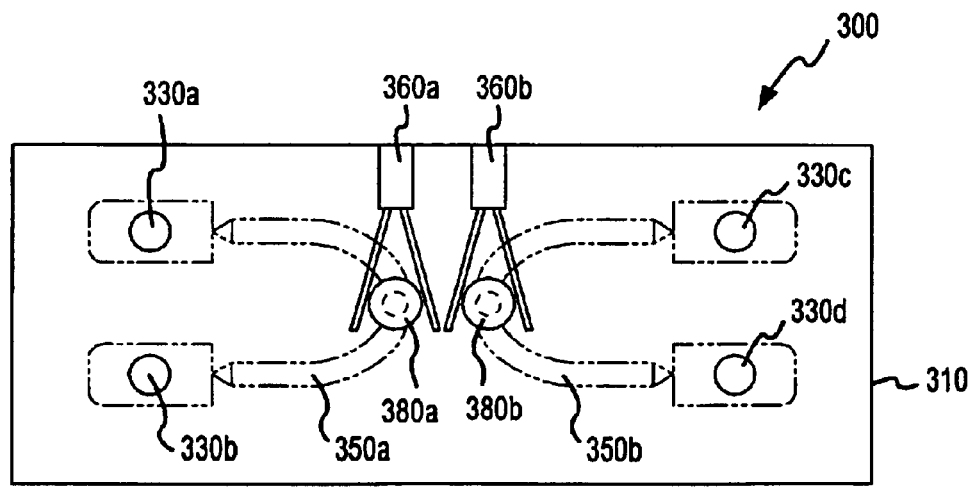
FIG. 5a is a schematic illustration of a bottom view of a carrier assembly in accordance with another exemplary embodiment of the present invention.
Figure 5B:
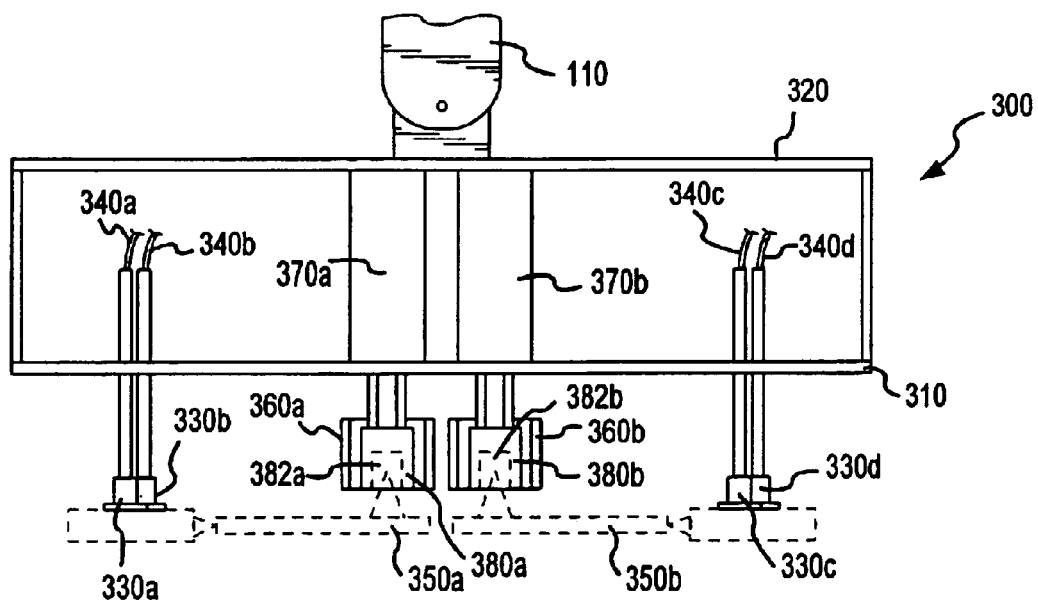

FIGS. 5a and 5b illustrate a carrier assembly 300, according to another exemplary embodiment of the present invention, with two runner assemblies 350a and 350b illustrated in broken lines superimposed thereon. Carrier assembly 300 illustrated in FIGS. 5a and 5b is configured to hold at least one runner assembly such as the runner assembly illustrated in FIGS. 2a and 2b. However, it will be appreciated that carrier assembly 300 may be suitably configured to hold any number of runner assemblies of different designs. Carrier assembly 300 includes a face place 310 mounted to a frame 320 which is movably connected to robot arm 110. A plurality of end effectors 330a, 330b, 330c, and 330d are mounted to face plate 310. In a preferable embodiment of the invention, end effectors 330 are suction devices that are connected to a vacuum source (not shown) via tubing 340a, 340b, 340c, and 340d, respectively. While carrier assembly 300 is illustrated in FIGS. 5a and 5b with two end effectors for each of the runner assemblies, it will be appreciated that carrier assembly 300 may include any number of end effectors suitable for holding a runner assembly. End effectors 330a–330d are suitably spaced so that, when holding runner assemblies 350a and 350b, each end effector holds a molded part that is to be degated from the runner of the runner assembly. Sprue gripper assemblies 360a and 360b are mounted to face plate 310 and are configured to grip the sprue of the runner assemblies 350a and 350b after the molded parts have been degated from the runner. In an alternative embodiment of the invention, runner assemblies 350a and 350b may be held by sprue gripper assemblies 360a and 360b without using end effectors 330a–330d.

Carrier assembly 300 also includes piston assemblies 370a and 370b, each having a piston 380a and 380b, respectively. When activated, piston assemblies 370a and 370b cause pistons 380a and 380b to move toward runner assemblies 350a and 350b and press runner assemblies 350a and 350b against an ultrasonic horn (not shown). Preferably, pistons 380a and 380b are positioned on the runner at a suitable point so that transmission of the mechanical vibrations along the runner to the gates is optimized. As illustrated in FIGS. 5a and 5b, pistons 380a and 380b may be positioned proximate the midpoint of the runner so that the transmission of ultrasonic energy along runner is maximized. In one embodiment of the invention, pistons 380a and 380b have recesses 382a and 382b for receiving sprues that may be located at the runner assembly's midpoint. In an alternative embodiment of the invention, pistons 380a and 380b may have grooves formed therein for recurring runner assemblies thereby reducing or eliminating movement of the runner assemblies relative to the ultrasonic horn.

Figure 11:
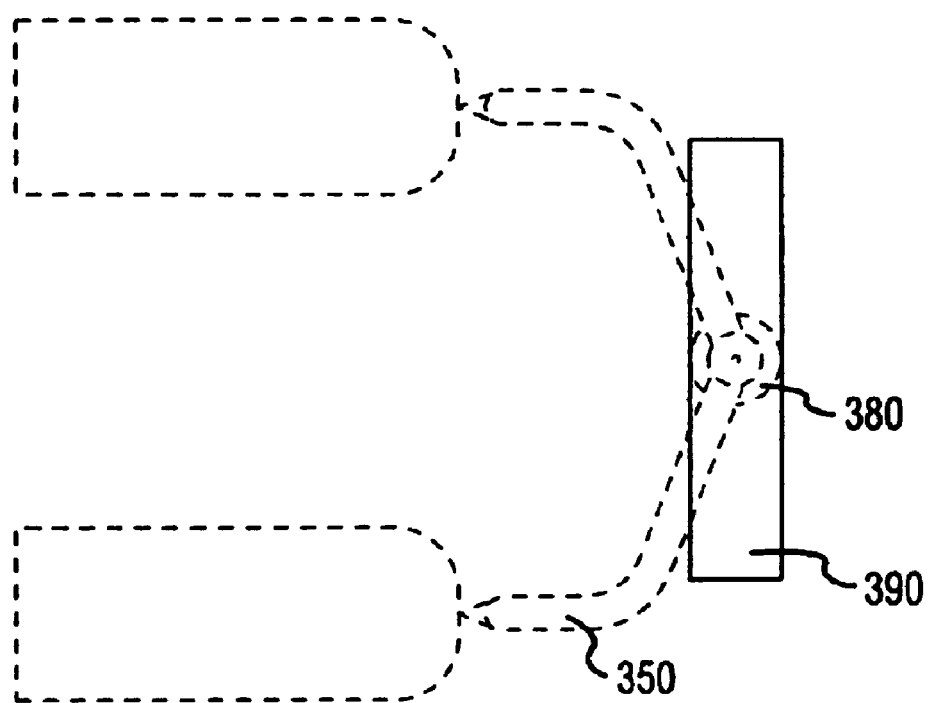
FIG. 11 is a top view of an ultrasonic horn, in accordance with an exemplary embodiment of the present invention, with a runner assembly superimposed thereon.

FIG. 11 illustrates one exemplary embodiment for the positioning of an ultrasonic horn 390 relative to the runner assembly 350 (of FIGS. 5a and 5b) superimposed thereon. FIG. 11 also illustrates the positioning of piston 380 relative to the runner assembly. Preferably, the contact area of piston 380 that contacts the runner assembly is of sufficient size so as to suitably press the runner assembly against ultrasonic horn 390 but is not so large as to dampen the transmission of ultrasonic energy to the gates of the runner. Although not illustrated in FIG. 11, it will be appreciated that ultrasonic horn 390 may be configured to have grooves or recesses suitable to receive the runner assembly and any under-sprue thereof. While one ultrasonic horn 390 is illustrated in FIG. 11 as proximate the midpoint of runner assembly 350, it should be understood that one or more ultrasonic horns may be suitably positioned proximate the runner so as to maximize transmission of ultrasonic energy to the gates.

Figure 6:
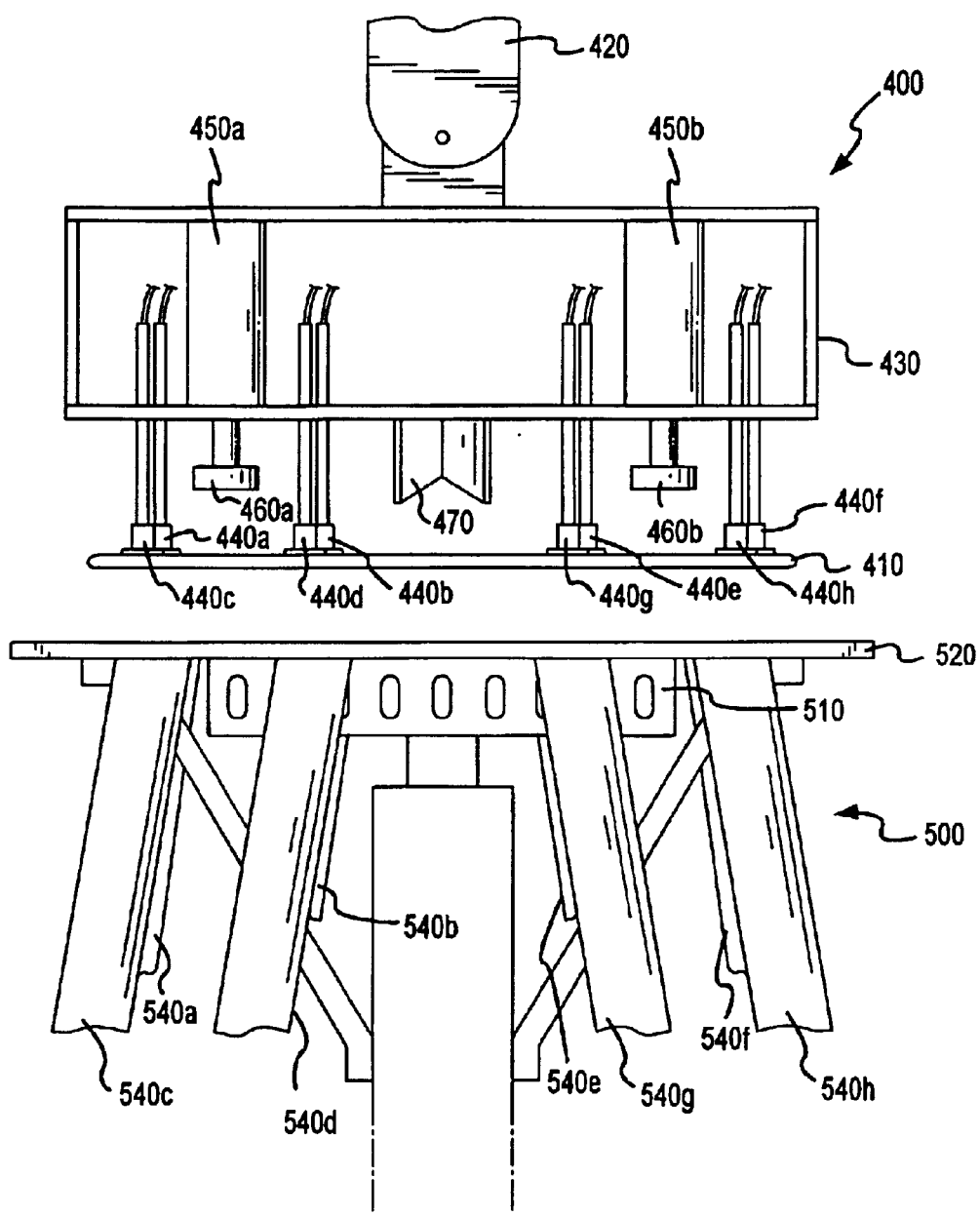
FIG. 6 is a schematic illustration of a carrier assembly and an ultrasonic degating assembly in accordance with an exemplary embodiment of the present invention.

A method for degating molded parts from the runner of a runner assembly using an exemplary embodiment of the system of the present invention will now be described. FIG. 6 illustrates a robot arm assembly 400 holding a runner assembly 410 after runner assembly 410 has been removed from a molding tool (not shown). For purposes of this example, runner assembly 410 is of a design similar to that of runner assembly 10 of FIGS. 1*a* and 1*b*, although it will be appreciated that robot arm assembly 400 may be configured to hold and process runner assemblies of any suitable design. To remove runner assembly 410 from a molding tool (not show), robot arm 420 positions a carrier assembly 430 proximate runner assembly 410 positioned in the molding tool. A plurality of suction devices 440*a*–440*h* are spaced so that when suitably positioned proximate the runner assembly 410, the suction devices are positioned proximate the molded parts of the runner assembly. Robot arm 420 then advances carrier assembly 430 towards runner assembly 410 so that suction devices 440*a*–440*h* contact the molded parts. Suction devices 440*a*–440*h* are then activated so that a vacuum is created between the molded parts and suction devices 440*a*–440*h*. Robot arm 420 then moves carrier assembly 430 away from the molding tool thereby removing runner assembly 410 therefrom.

Figure 9:
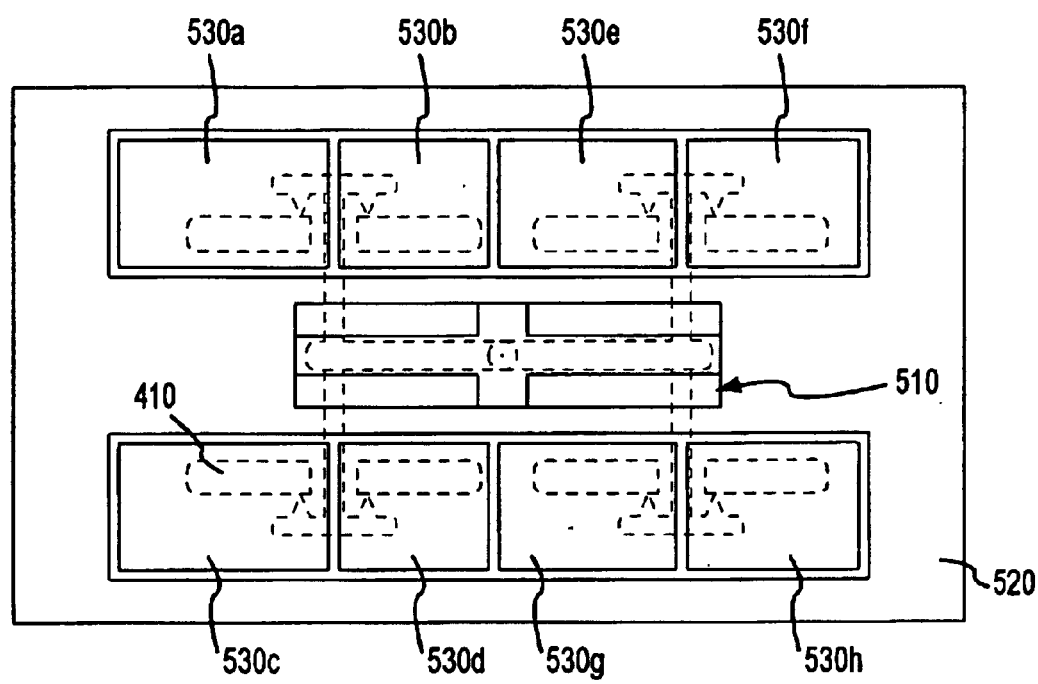
FIG. 9 is a schematic illustration of a top view of a base of an ultrasonic degating assembly in accordance with an exemplary embodiment of the present invention.

Robot arm assembly 400 then positions runner assembly 410 proximate an ultrasonic degating assembly 500, which includes a source of ultrasonic energy, such as ultrasonic horn 510. Ultrasonic horn 510 is preferably a bar horn, although any suitable ultrasonic horn may be used. Ultrasonic degating assembly 500 also includes a base 520 to which ultrasonic horn 510 is invertedly mounted. Referring momentarily to FIG. 9, in another embodiment of the invention, base 520 may include a plurality of openings 530*a*–530*h*. Openings 530*a*–530*h* are preferably positioned below the molded parts of runner assembly 410 when runner assembly 410 is suitably positioned proximate ultrasonic horn 510 so that when the molded parts are degated from runner assembly 410, they are free to drop through openings 530*a*–530*h*. While base 520 is illustrated in FIG. 9 having eight openings, it will be appreciated that base 520 may have any number of openings suitable for permitting the molded parts to drop from the runner for subsequent collection.

Figure 7:
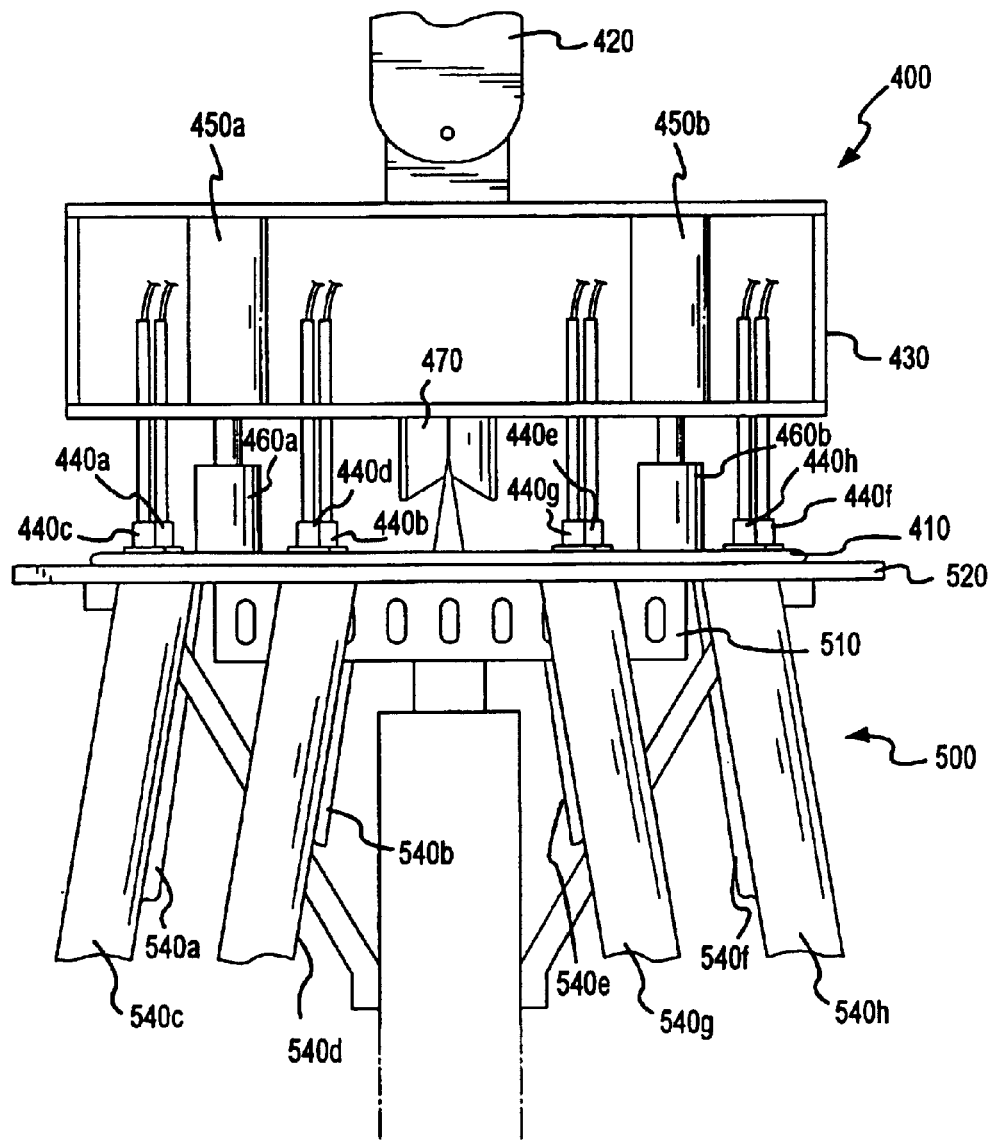
FIG. 7 is a schematic illustration of the carrier assembly of FIG. 6 pressing a runner assembly against the ultrasonic degating assembly of FIG. 6.

In another embodiment of the invention, ultrasonic degating assembly 500 may also include a plurality of corresponding collection tubes 540*a*–540*h* mounted to base 520, as illustrated in FIGS. 6 and 7, to direct the molded parts to collection buckets (not shown) or a conveyor belt (not shown) for use in subsequent manufacturing processes. While collection tubes 540*a*–540*h* are illustrated in FIGS. 6 and 7 as mounted to base 520 for direction of the molded parts for collection, it will be appreciated that collection tubes 540*a*–540*h* are not essential to the system of the present invention and the molded parts may be free to drop from openings 530*a*–530*h* directly to collection buckets or a conveyor belt positioned proximate the ultrasonic degating assembly.

As illustrated in FIG. 7, robot arm assembly 400 advances runner assembly 410 against the ultrasonic horn 510. Suction devices 440*a*–440*h* are deactivated and piston assemblies 450*a* and 450*b* are activated to move pistons 460*a* and 460*b* against the runner assembly 410 so that the runner of runner assembly 410 is pressed against ultrasonic horn 510. Pistons 460*a* and 460*b* press runner assembly 410 against ultrasonic horn 510 with sufficient force to cause ultrasonic vibrations to be transmitted from the horn to the runner and along the runner to the gates. Such force generally is in the range of about 10 lbs. to about 40 lbs. but is preferably in the range of about 15 lbs to about 25 lbs. The ultrasonic horn typically is configured to emit ultrasonic energy at a frequency in the range of about 20 kHz to about 40 kHz. The ultrasonic horn is activated for a suitable amount of time to permit the molded parts of runner assembly 410 to degate from the runner. Once the molded parts have separated from the runner, a sprue gripper assembly 470 is then activated to grasp a sprue of runner assembly 410 and remove the degated runner from the ultrasonic degating assembly. Robot arm assembly 400 then moves the degated runner from ultrasonic degating assembly 500 so that the runner may be discarded.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for removing from a molding tool a runner assembly comprising a plurality of molded parts that are connected to a runner via gates and subsequently degating the plurality of molded parts from the runner, said system comprising:
   a source of ultrasonic energy; and
   a robot arm assembly configured to remove the runner assembly from the molding tool and to position the runner assembly proximate to the source of ultrasonic energy, said robot arm assembly comprising:
   a robot arm; and
   a carrier assembly movably connected to said robot arm and configured to hold and carry the runner assembly, said carrier assembly comprising at least one piston assembly configured to press the runner against said source of ultrasonic energy.

2. The system of claim 1, said source of ultrasonic energy comprising an ultrasonic horn.

3. The system of claim 1, wherein said at least one piston assembly comprises a piston having a groove configured to permit at least a portion of the runner to be positioned therein.

4. The system of claim 1, wherein said carrier assembly further comprises at least one end effector configured to hold at least a portion of said runner assembly.

5. The system of claim 4, wherein said at least one end effector comprises a suction device.

6. The system of claim 1, wherein said carrier assembly further comprises a gripper configured to grip a portion of the runner assembly.

7. The system of claim 1, further comprising a base to which said source of ultrasonic energy is invertedly mounted.

8. The system of claim 7, wherein said base comprises at least one opening configured so that, when the plurality of molded parts is degated from the runner, at least one of the plurality of molded parts is permitted to drop through said at least one opening for collection.

9. The system of claim 8, further comprising at least one collection tube, wherein said at least one collection tube is mounted to said base proximate to said at least one opening to direct said molded parts from said at least one opening to a collection unit.

10. The system of claim 9, said collection unit comprising at least one collection bucket.

11. The system of claim 9, said collection unit comprising a conveyor belt.

12. The system of claim 2, wherein said ultrasonic horn is configured to receive at least a portion of the runner assembly so that the transmission of ultrasonic energy along the runner to the gates is optimized.

13. A robot arm assembly for holding a runner assembly comprising a plurality of molded parts and a runner connected thereto during degating of the plurality of molded parts from the runner, the robot arm assembly comprising:
   a robot arm configured to transport the runner assembly from a molding tool to a source of ultrasonic energy; and
   a carrier assembly configured to hold the runner assembly, said carrier assembly comprising:
      a face plate movably connected to said robot arm;
      at least one holding device connected to said fare plate and configured to hold said runner assembly; and
      at least one piston assembly connected to said face plate and configured to press said runner assembly against said source of ultrasonic energy.

14. The robot arm assembly of claim 13, wherein said at least one holding device comprises a suction device.

15. The robot arm assembly of claim 13, wherein said carrier assembly further comprises a gripper configured to grip a portion of the runner assembly.

16. The robot arm assembly of claim 13, wherein said at least one piston assembly comprises a piston configured to press the runner against said source of ultrasonic energy.

17. The robot arm assembly of claim 16, wherein said piston comprises a groove configured to permit at least a portion of the runner to be positioned therein.

* * * * *